(12) United States Patent
Hahm et al.

(10) Patent No.: US 7,447,496 B2
(45) Date of Patent: *Nov. 4, 2008

(54) METHOD FOR PROVIDING SUBSCRIBER-BASED RINGBACK TONE THROUGH A CALL-ORGINATING EXCHANGER

(75) Inventors: Hee Hyeok Hahm, Seoul (KR); Ki Mun Kim, Incheon-si (KR); Sang Yun Lee, Seongnam (KR); Yeong Tae No, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 237 days.

This patent is subject to a terminal disclaimer.

(21) Appl. No.: 10/523,787

(22) PCT Filed: Jul. 28, 2003

(86) PCT No.: PCT/KR03/01506

§ 371 (c)(1),
(2), (4) Date: Oct. 5, 2005

(87) PCT Pub. No.: WO2004/016021

PCT Pub. Date: Feb. 19, 2004

(65) Prior Publication Data

US 2006/0126815 A1    Jun. 15, 2006

(30) Foreign Application Priority Data

Aug. 9, 2002    (KR) .................. 10-2002-0047212

(51) Int. Cl.
*H04Q 7/38*    (2006.01)

(52) U.S. Cl. .................. 455/414.1; 455/432.3; 455/433; 455/567; 379/373.03; 379/207.16

(58) Field of Classification Search ... 455/414.1–414.3, 455/433, 432.3; 379/257, 207.16, 372–374.3
See application file for complete search history.

(56) References Cited

U.S. PATENT DOCUMENTS 5,926,537 A    7/1999    Birze (Continued)

FOREIGN PATENT DOCUMENTS

JP    2000-050347    2/2000

(Continued)

*Primary Examiner*—George Eng
*Assistant Examiner*—Marcos L Torres
(74) *Attorney, Agent, or Firm*—Lowe Hauptman Ham & Berner, LLP

(57) ABSTRACT

In a method for providing an arbitrary sound, chosen by a called subscriber, as a ringback tone to a calling subscriber through a call-originating exchanger, the call-originating exchanger requests a trunk connection to a sound database server based on first information on whether or not to replace an RBT (RingBack Tone) and second information on a route to the sound database server that are received from a home location register (HLR), and provides a called subscriber identification for the sound database server. Then, the sound database server searches its database for a sound specified by the called, and provides the found sound for the caller instead of a conventional RBT via the originating exchanger connected through the requested trunk connection. The caller can hear a sound specified by the called instead of the conventional RBT.

18 Claims, 6 Drawing Sheets

U.S. PATENT DOCUMENTS 6,427,076 B2 * 7/2002 Skog .......................... 455/433
2004/0204146 A1 * 10/2004 Deeds ........................ 455/567

FOREIGN PATENT DOCUMENTS

| JP | 2001-106685 | | 4/2001 |
| KR | 2000-000244 | | 1/2000 |
| KR | 2000-030035 | | 6/2000 |
| KR | WO 00/49793 | * | 8/2000 |
| KR | 2000-055316 | | 9/2000 |
| KR | 100292089 | * | 6/2001 |
| KR | 2001-108937 | | 12/2001 |
| KR | 2002-039501 | | 5/2002 |
| WO | WO 00/42763 | | 7/2000 |

* cited by examiner

FIG. 6

| Parameter=CallingFeaturesIndicator2 | | | | | | | | Length=V | Tag=H'9fff7d |
|---|---|---|---|---|---|---|---|---|---|
| Contents | | | | | | | | meaning | |
| H | G | F | E | D | C | B | A | Octet | Notes |
| VMSB | | VMSU | | MC | | CC | | 1 | |
| FMSNA | | FMSB | | FMSU | | VMSNA | | 2 | a |
| SRBT | | NCW | | Prefer_Sys | | MUDN | | 3 | |
| ·········· | | | | | | | | n | |

*defined 'reserve' field before*

METHOD FOR PROVIDING SUBSCRIBER-BASED RINGBACK TONE THROUGH A CALL-ORGINATING EXCHANGER

CROSS REFERENCE TO RELATED APPLICATION

This application is the National Phase application of International Application No. PCT/KR/2003/001506, filed Jul. 28, 2003, which designates the United States and was published in English. This application, in its entirety, is incorporated herein by reference.

TECHNICAL FIELD

The present invention relates to a method for providing an arbitrary sound chosen by a called subscriber for a calling subscriber instead of a conventional ringback tone.

BACKGROUND ART

When a subscriber calls another through a mobile communication network, a terminating exchanger on the network provides the caller with a uniform ringback tone.

Since the ringback tone is same all the time, a caller can not identify a called before the called answers. Furthermore, the uniform ringback tone can not satisfy various subscribers' needs to reveal their individuality.

By the way, various ad methods are being proposed in these days. One of these ad methods is to send an ad sound message to a caller instead of a conventional ringback tone. However, such an ad sound message is chosen unilaterally by a network operating enterprise. If a caller heard such a unilateral ad sound he or she could talk over a mobile telephone with a called for a limited time.

However, the method that an ad sound is provided instead of a conventional ringback tone still has the aforementioned drawbacks. That is, a caller can not identify a called before the called answers and the uniform ringback tone can not satisfy various subscribers' needs to reveal their individuality.

DISCLOSURE OF INVENTION

It is an object of the present invention to provide method for providing an arbitrary sound chosen or registered by a called subscriber for a caller instead of a conventional RBT (Ring-Back Tone). In the present method, an arbitrary RBT-replacing sound chosen or registered by a subscriber is stored in a server separated from mobile exchangers first, and if a certain subscriber is called, an originating exchanger for the call receives from the server an RBT-replacing sound that is assigned to the called, and then provides the received sound for a caller instead of a conventional RBT.

A method of providing an arbitrary sound as an RBT in accordance with the present invention is characterized in that it comprises the steps of: an HLR's (Home Location Register's) furnishing a call-originating exchanger with first information on whether RBT is to be replaced or not and second information informing a route to sound providing means through a response to a location request message received from the call-originating exchanger that sends the location request message to the HLR when a call connection is requested; the call-originating exchanger's requesting a trunk connection to both of a call-terminating exchanger and the sound providing means based on the response including the first and the second information while furnishing the sound providing means with information identifying a called; and the sound providing means' selecting an RBT-replacing sound based on the called-identifying information, and providing the selected RBT-replacing sound for the caller through the call-originating exchanger the trunk connection is made to.

If the call-originating exchanger detects through the call-terminating exchanger that the call is answered from a called while the selected RBT-replacing sound is being provided for the caller, it requests the sound providing means to release the established trunk connection to terminate transmission of the RBT-replacing sound.

The above-characterized method provides a personal ad way by allowing a registered personal introducing or identifying sound to be used instead of an RBT. In addition, a caller is able to know by only hearing an RBT-replacing sound whether he or she called rightly, as a result, wrong connections can be reduced. An enterprise as well as individual persons can advertise efficiently through registering an RBT-replacing sound.

BRIEF DESCRIPTION OF DRAWINGS

In the drawings:

FIG. 1 is a simplified diagram of a mobile communication network which a subscriber-based RBT-replacing sound providing method through a call-originating exchanger is embedded in;

FIG. 6 shows format of the value-added service parameters including an RBT-replacing service field that are delivered from an HLR (Home Location Register) to a call-originating exchanger.

MODES FOR CARRYING OUT THE INVENTION

In order that the invention may be fully understood, a preferred embodiment thereof will now be described with reference to the accompanying drawings.

Figure 1:
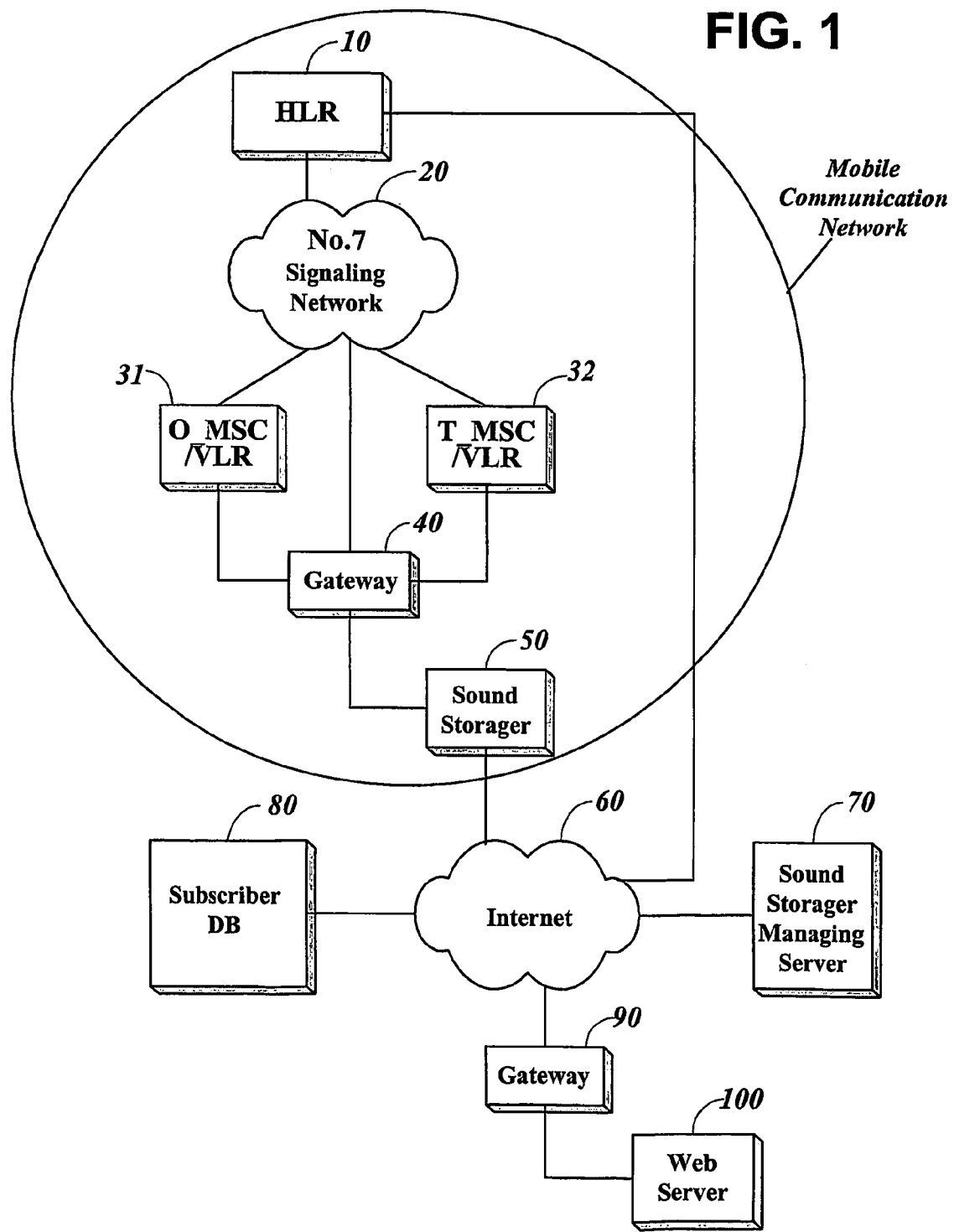

FIG. 1 is a simplified diagram of a mobile communication network which a subscriber-based RBT-replacing sound providing method through a call-originating exchanger is embedded in.

The network of FIG. 1 includes an HLR (Home Location Register) 10; mobile exchangers 31 and 32 (also called 'MSC' (Mobile Switching Center)) being capable of communicating with the HLR 10 via a No. 7 signaling network 20 based on No. 7 signaling transfer protocol; a sound storager 50, connected to the No. 7 signaling network 20 via a gateway 40, storing RBT-replacing sounds and communicating with the exchangers 31 and 32; an SSMS (Sound Storager Managing Server) 70, connected to the sound storager 50 via Internet 60, controlling management of RBT-replacing sounds in the sound storager 50; a subscriber db 80 connected to the HLR 10 via Internet 60; and a web server 100, connected to Internet 60 via a gateway 90, communicating with the sound storager 50 and the SSMS 70.

The HLR 10 functions as a conventional network element and it has in every subscriber profile the first information on whether RBT is to be replaced or not and the second information informing a route to the sound storager 50. The first and the second information are written in the value-added service parameters of each subscriber profile.

Either of the mobile exchangers 31 and 32 functioning as conventional network elements receives the first and the second information of a subscriber that are included in a message from the HLR 10 responsive to a location request message sent to the HLR 10 when a call is generated, and then the exchanger 31 or 32 requests a call connection to another exchanger, namely, a call-terminating exchanger as well as requests the sound storager 50 to send an RBT-replacing sound based on the received first and second information. If an RBT-replacing sound is received, it provides a caller with the received RBT-replacing sound.

The sound storager 50 stores a plurality of digital sounds to be used for replacing an RBT. The stored digital sounds are provided for the exchangers 31 and 32 via the gateway 40.

The SSMS 70 communicates with the sound storager 50 via Internet 60 and it chooses a digital sound based on information written in an RBT service table. A unique code to identify the chosen digital sound is notified the sound storager 50 in order that a stored sound identified by the code is sent to the exchanger 31 or 32 from the sound storager 50. The RBT service table used for choice of a digital sound allocated for each subscriber includes several codes linked to caller's personal information, caller or caller-group identifying information, and/or call time zone. Therefore, a digital sound can be chosen by the SSMS 70 based on who calls, which group a caller belongs to, age, sex, or occupation of a caller, and/or when a subscriber is called.

Information in the RBT service table is determined when a person subscribes to the value-added service and is then modified by his or her request.

The web server 100, connected to the sound storager 50 and/or the SSMS 70 via Internet 60, adds digital sounds to the sound storager 50 and conducts operations to update or change contents of the RBT service table and codes, if necessary, related digital sounds for the SSMS 70. The updating or changing operation is initiated by subscriber's request through web pages of the web server 100.

An embodiment of a subscriber-based RBT-replacing sound providing method through a call-originating exchanger is explained below along with accompanying operations of the network of FIG. 1.

Figure 2:
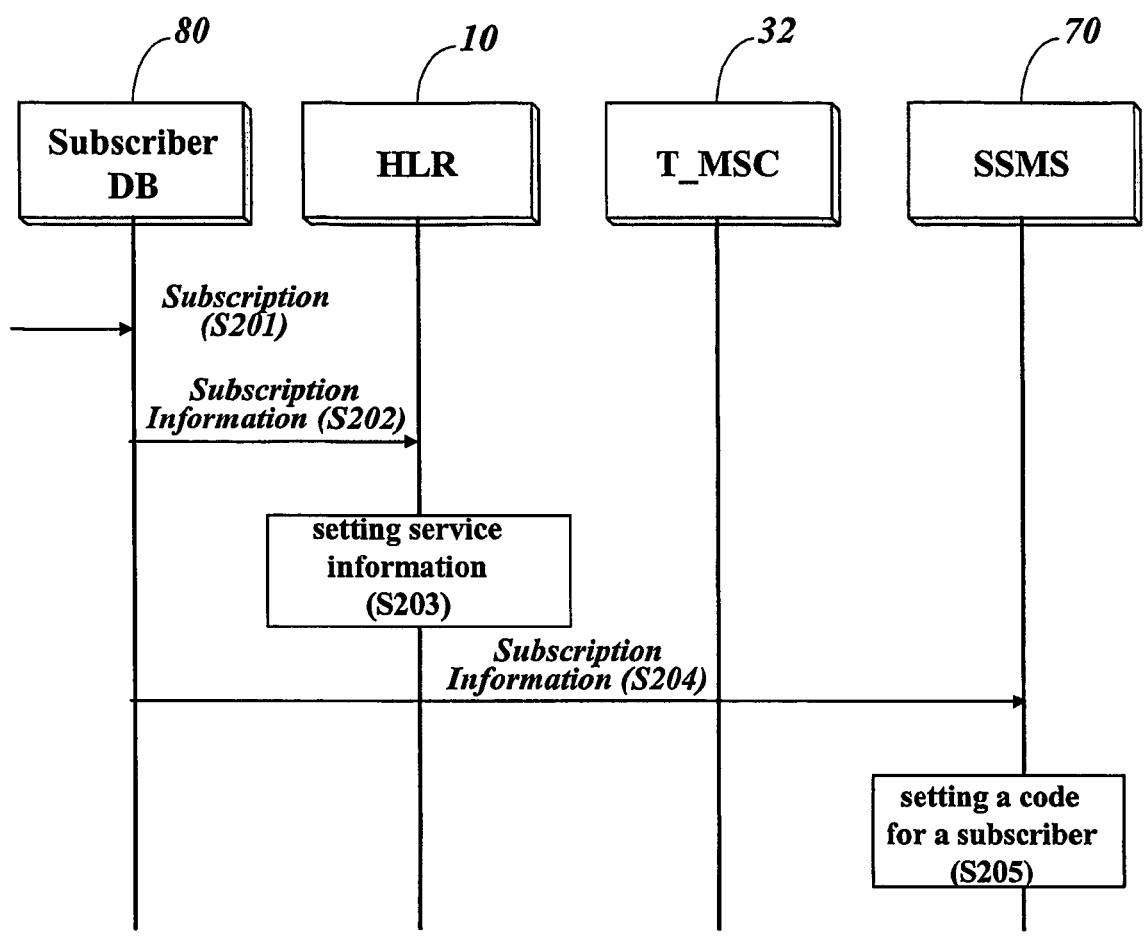
FIG. 2 is a procedure chart of an embodiment of the present invention to subscribe to a subscriber-based RBT-replacing sound providing service through a call-originating exchanger.

FIG. 2 is a procedure chart of an embodiment of the present invention to subscribe to a subscriber-based RBT-replacing sound providing service conducted through an originating exchanger.

If subscription to the RBT-replacement service is asked (S201), subscription information including mobile telephone number of the subscriber is stored in the subscriber db 80 first and is then delivered to the HLR 10 (S202). The HLR 10 updates service information of the subscriber profile to indicate that the subscriber has subscribed to RBT replacement service (S203).

In addition, the subscriber db 80 also sends the subscription information including a chosen digital sound and mobile telephone number to the SSMS 70 (S204). The SSMS 70 writes a code associated with the chosen digital sound in an RBT service table allocated for that mobile telephone number (S205).

If the received subscription information includes particulars of sound assignments, namely if the received subscription information assigns different digital sounds for each caller, each caller group, and/or each time zone, the SSMS 70 writes different codes of the respective digital sounds in each condition field of the RBT service table, at the step S205.

Figure 3:
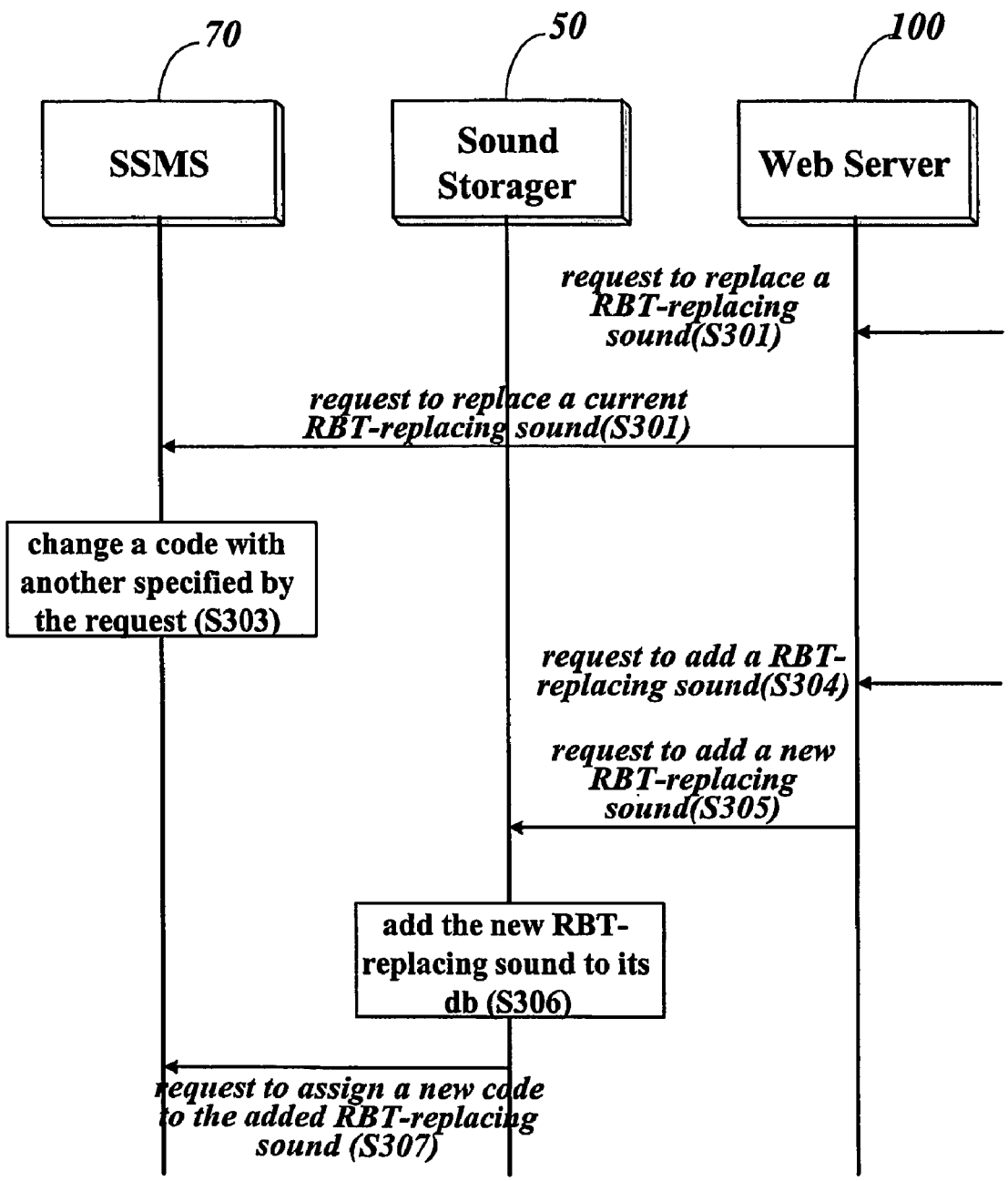
FIG. 3 is a procedure chart of another embodiment of the present invention to change/add subscription information related with an RBT-replacing sound providing service through a call-originating exchanger.

FIG. 3 is a procedure chart of another embodiment of the present invention to change/add subscription information related with RBT-replacing sound providing service conducted through an originating exchanger.

A subscriber, who has subscribed to the RBT replacement service according to the above-explained procedure of FIG. 2, connects his or her personal computer to the web server 100, first. Then, the web server 100 provides web pages on the connected computer screen to enable the subscriber to change/add information about RBT replacement service.

The subscriber enters mobile telephone number (or telephone number+password allocated in subscription) through an adequate web page and then selects a desired RBT-replacing sound from a list showing all or a part of sounds stored in the sound storager 50. If the subscriber requests change of RBT-replacing sound to the chosen one (S301), the web server 100 sends a change-requesting message to the SSMS 70 (S302). The SSMS 70 changes the current code with another code assigned to the chosen RBT-replacing sound in an RBT service table allocated for the entered mobile telephone number (S303). Afterwards, an RBT-replacing sound identified by the changed code will be provided instead of a conventional RBT.

If the subscriber selects to add a new RBT-replacing sound on a web page, the SSMS 70 provides an input web page. Then, the subscriber enters his or her mobile telephone number in the input web page and uploads a sound file including voice, sound logo, or music through the input web page (S304). The web server 100 requests the sound storager 50 to add a new RBT-replacing sound by delivering the inputted data to the sound storager 50 (S305). The sound storager 50 registers the uploaded sound file as a new RBT-replacing sound (S306) and requests the SSMS 70 to assign a new code to the registered RBT-replacing sound (S307). The SSMS 70 informs the sound storager 50 of the newly-assigned code and changes the current code with the newly-assigned code in an RBT service table allocated for the subscriber.

Figure 4:
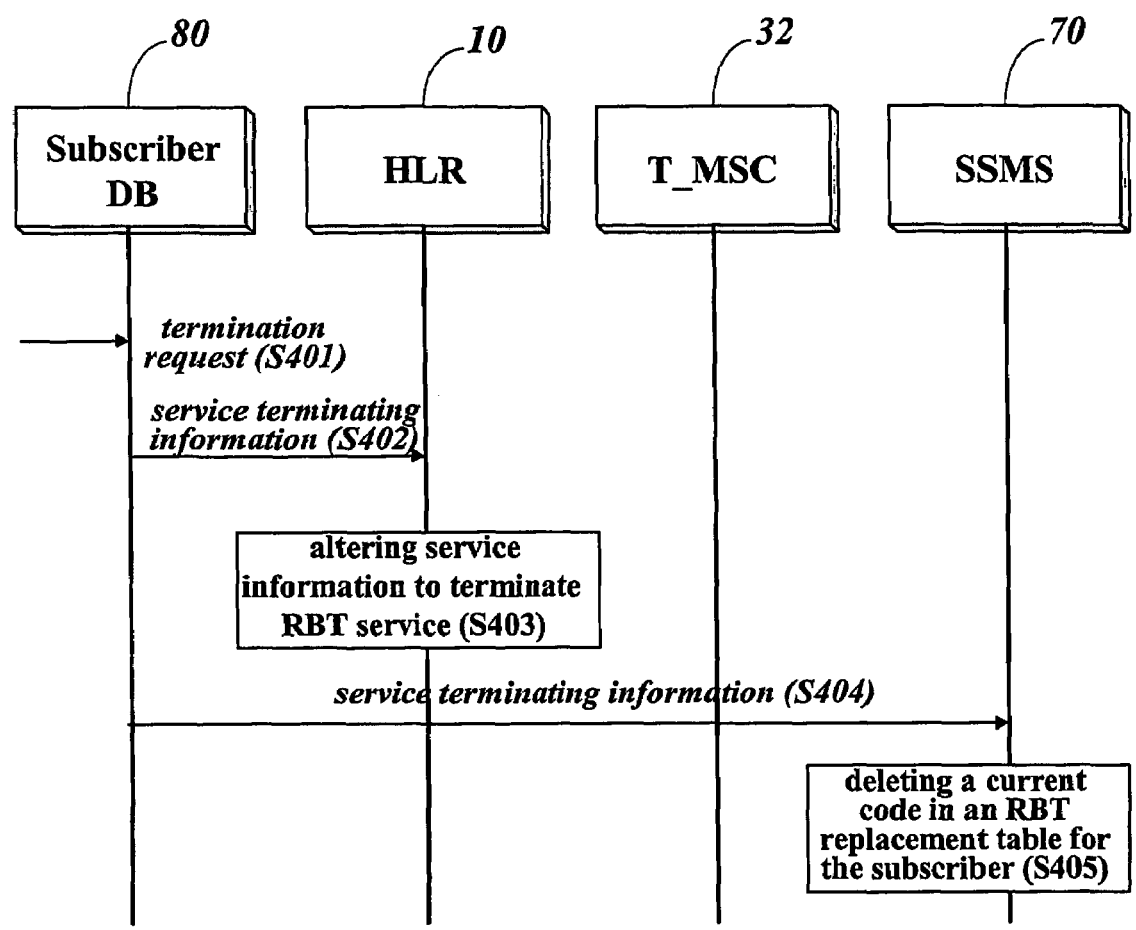
FIG. 4 is a procedure chart of another embodiment of the present invention to terminate a subscriber-based RBT-replacing sound providing service through a call-originating exchanger.

FIG. 4 is a procedure chart of another embodiment of the present invention to terminate a subscriber-based RBT-replacing sound providing service conducted through an originating exchanger.

If termination of RBT replacement service is asked from a subscriber (S401), the subscriber db 80 deletes subscription information for RBT replacement service associated with the subscriber, namely, the subscriber's telephone number, and sends service terminating information including a mobile telephone number to the HLR 10 (S402). The HLR 10 alters service information of the subscriber's profile to indicate that the subscriber has not subscribed to RBT replacement service (S403).

The subscriber db 80 also sends the service terminating information to the SSMS 70 (S404), then the SSMS 70 deletes a current code in an RBT service table for the subscriber based on the received service terminating information (S405).

Figure 5:
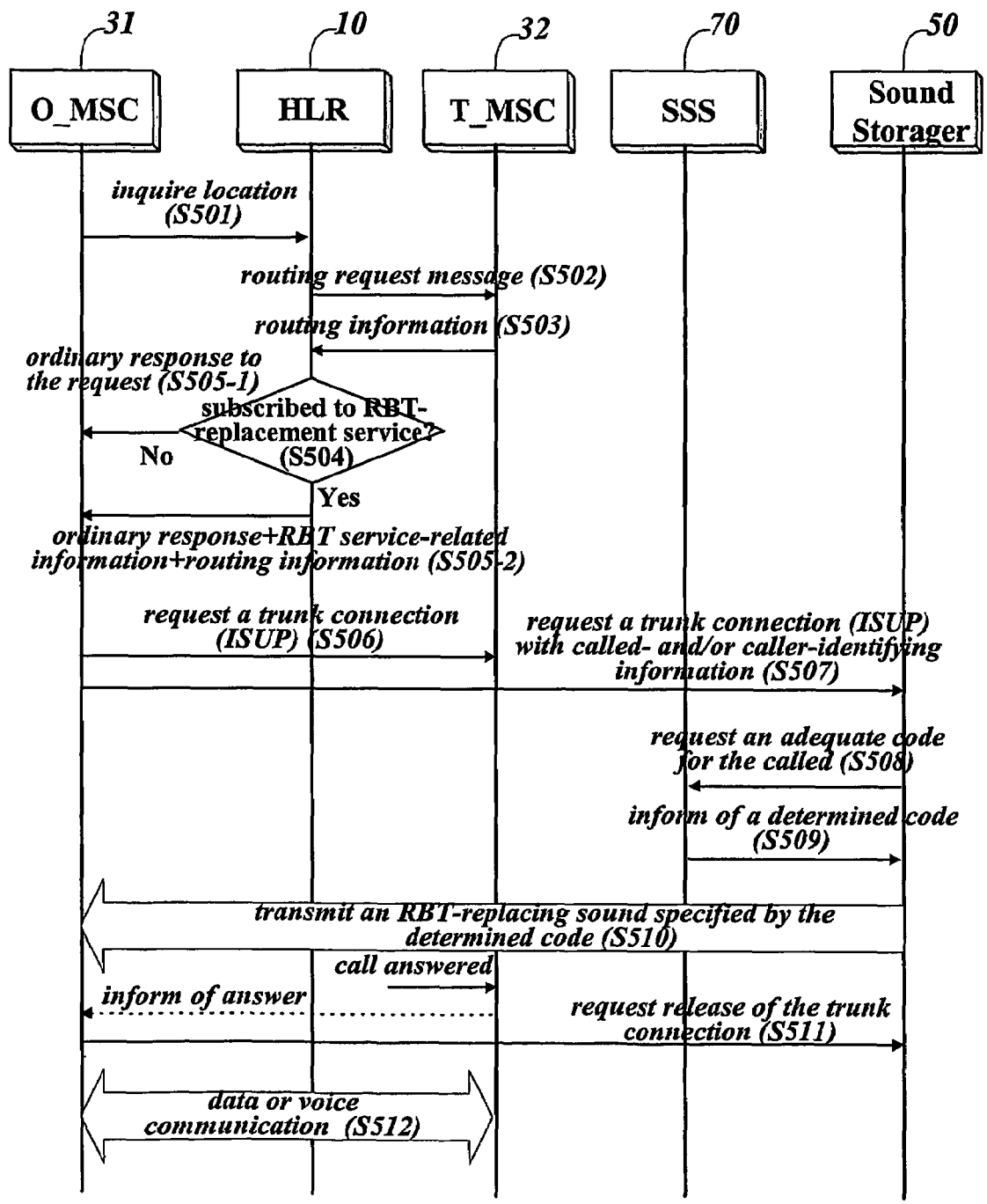
FIG. 5 is a procedure chart of another embodiment of the present invention to conduct a subscriber-based RBT-replacing sound providing service after completion of the procedure of FIGS. 2 and/or 3.

FIG. 5 is a procedure chart of another embodiment of the present invention to conduct a subscriber-based RBT-replacing sound providing service through an originating exchanger after completion of the procedure of FIG. 2 and/or FIG. 3.

If an arbitrary subscriber within a service zone of the exchanger 31 calls another subscriber, who has subscribed to the RBT replacement service, within the exchanger 32, the originating exchanger 31 sends a location request message to the HLR 10 to inquire where the called is (S501). Then, the HLR 10 sends a routing request message to the terminating exchanger 32 (S502), and the terminating exchanger 32 informs the HLR 10 of routing information, e.g., TLDN (Temporary Local Directory Number) in response to the routing request message (S503).

The HLR 10 delivers the routing information to the originating exchanger 31 in response to the inquiry step S501. In addition, the HLR 10 checks profile of the subscriber to know whether the called subscriber has been subscribed to the RBT replacement service (S504). If not subscribed, the HLR 10 sends an ordinary response message to the location registration request to the originating exchanger 31 as in the conventional responding procedure (S505-1). The ordinary response message includes TLDN information of the terminating exchanger 32. However, if subscribed, the HLR 10 sends the originating exchanger 31 a response message further including RBT service-related information and routing information, e.g., routing digits to direct to the sound storage 50 (S505-2).

The RBT service-related information can be carried by an SRBT (Specific RBT) field, which was defined as a 'reserve' field before, of the value-added service parameters 'CallingFeaturesIndicator2' shown in FIG. 6. The 2-bit SRBT field is set to '10' in case that the RBT replacement service is not activated even though that service is valid by subscription, and it is set to '11' in case that the RBT replacement service is in active state. A message including the parameters 'CallingFeaturesIndicator2' responsive to the location registration request is delivered from the HLR 10 to the originating exchanger 31.

The service information parameters 'CallingFeaturesIndicator2' of FIG. 6 are composed of a VMSB field indicative of state of voice mail service busy; a VMSU field indicative of state of voice mail service busy unconditional; a VMSNA field indicative of state of voice mail service busy no answer; an FMSNA field indicative of state of fax mail service no answer; an FMSB field indicative of state of fax mail service busy; an FMSU field indicative of state of fax mail service unconditional; an MC field indicative of multi-call; a CC field indicative of conference call; an MUDN field indicative of multiple unit directory number; and others.

The originating exchanger 31 requests a trunk connection (called 'ISUP') to only the terminating exchanger 32 (S506) or both of the exchanger 32 and the sound storage 50 (S506 and S507), based on the information included in the location request response message transmitted from the HLR 10 through conduction of the step S505-1 or S505-2.

That is, the originating exchanger 31 makes a single trunk connection to only the terminating exchanger 32 in case of the step S505-1, and checks the SRBT field in case of the step S505-2. If the SRBT field is '10' the originating exchanger 31 makes a single trunk connection to only the terminating exchanger and, if '11', it makes dual trunk connections to both. During communication to setup trunk connection, mobile telephone numbers of the caller and the called are sent to the sound storage 50 (S506). While the above processes are conducted, a conventional RBT is blocked by the originating exchanger 31 not to be transmitted to the caller.

Now, a single trunk connection is made between the originating 31 and the terminating exchanger 32 in the event that only the step S506 is conducted, or respective trunk connections are made between the originating 31 and the terminating exchanger 32 and between the originating exchanger 31 and the sound storage 50 in the event that both steps S506 and S507 are conducted together.

The reason that the calling number is informed the sound storage 50 besides the called number is to make it possible to provide different RBT-replacing sound depending upon who the caller is or which group among groups classified by the called the caller belongs to.

When a trunk connection is made to the originating exchanger 31 according to conduction of the step S507, the sound storage 50 asks an adequate code to the SSMS 70 while providing the received numbers for the SSMS 70 (S508). The SSMS 70 examines an RBT service table allocated for the called number to determine a code matched with the calling number (if received), and informs the sound storager 50 of the determined code (S509) in response to the code-requesting step S508. The sound storage 50 transmits an RBT-replacing sound corresponding to the determined code to the caller through the trunk connection made between the sound storage 50 and the originating exchanger 31 (S510).

When the SSMS 70 determines an adequate code it may consider the present time. That is, the SSMS 70 may determine a code associated with a time zone the present time belongs to for the called and the caller (if received). Considering the present time, different RBT-replacing sound can be provided if calling time is different.

If the called answers paging of the terminating exchanger 32 while the determined RBT-replacing sound is being transmitted instead of a conventional RBT, the originating exchanger 31 that is informed of such an answer by the terminating exchanger 32 requests the sound storage 50 to release the established trunk connection (S511). Then, voice or data are communicated between the caller and the called through the trunk connection between the originating 31 and the terminating exchanger 32 (S512).

In the present RBT-replacing sound providing service through a call-originating exchanger, a subscriber can access the HLR 10 to change the SRBT field of the value-added service parameters.

For instance, when a subscriber presses a special key on his or her mobile telephone the pressed key information is delivered to the HLR 10 which changes the 2-bit SRBT field based on the key information or alternately. However, more significant bit of the two can not be altered because it indicates whether or not subscribed to the RBT replacement service. Less significant bit can be altered by the above way because it indicates whether the RBT replacement service is activated or not.

Thus, in case of a person having subscribed to RBT replacement service, The SRBT field of the value-added service parameters for that person has a value of '10' or '11' only where the value '10' is indicative of 'inactive' of the service and '11' indicative of 'active'.

The special key commands change the 'SRBT' field from '10' to '11' or from '11' to '10'. Consequently, a subscriber can determine at will whether to use a conventional RBT or RBT-replacing sound he or she has chosen. If the 'SRBT' field included in a response message from the HLR 10 is '10', the originating exchanger 31 transmits a conventional RBT to a caller although a called has subscribed to the RBT replacement service.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

The invention claimed is:

1. A method of providing a predetermined sound as an RBT (RingBack Tone) in a communication network, said method comprising:
    an HLR (Home Location Register) furnishing a call-originating exchanger with first information on whether an RBT is to be replaced or not and second information on a route to a sound database through a response to a location request message received from the call-originating exchanger that sends the location request message to the HLR when a call connection is requested by a caller to a called terminal;
    the call-originating exchanger requesting a first trunk connection to a call-terminating exchanger and a separate, second trunk connection to the sound database based on the response including the first and the second information, while furnishing the sound database with third information identifying the called terminal; and
    the sound database selecting an RBT-replacing sound based on the third information and providing the selected RBT-replacing sound to the caller through the second trunk connection and the call-originating exchanger.

2. The method of claim 1, wherein, if the call-originating exchanger detects through the call-terminating exchanger that the call is answered while the selected RBT-replacing sound is being provided for the caller, the call-originating exchanger requests the sound database to release the established second trunk connection to terminate transmission of the selected RBT-replacing sound.

3. The method of claim 1, wherein the sound database searches for the selected RBT-replacing sound specified for the called terminal through communication with a storage controller operating based on the internet protocol.

4. The method of claim 1, wherein the request for the second trunk connection from the call-originating exchanger to the sound database is selectively conducted based on the first information included in the response.

5. The method of claim 1, wherein the first information indicates whether an RBT is to be replaced or not and is set in the HLR based on specific key information received from the called terminal.

6. The method of claim 5, wherein the first information is written in a reserve field allocated in value-added service parameters of a subscriber's profile of a subscriber using the called terminal.

7. The method of claim 1, wherein the sound database selects the RBT-replacing sound based on at least one of
    who the caller is,
    which group, among several groups classified by a subscriber using the called terminal, the caller belongs to, and
    the caller's time zone.

8. The method of claim 1, wherein the third information also identifies the caller.

9. The method of claim 8, wherein the third information includes telephone numbers of the called terminal and the caller, respectively.

10. The method of claim 3, wherein the storage controller changes a sound code of an RBT-replacing sound specified for the called terminal with another code through communication with a web server operating based on the internet protocol.

11. The method of claim 10, wherein said another code is associated with another already stored RBT-replacing sound in the sound database or is a newly-assigned code for a newly stored RBT-replacing sound received from the web server.

12. The method of claim 11, wherein, after being connected to the sound database and the storage controller, the web server changes the RBT-replacing sound based on subscriber identifying information entered through an input web page.

13. The method of claim 11, wherein the sound database searches for the selected RBT-replacing sound by
    forwarding the third information received from the call-originating exchanger to the storage controller;
    requesting the storage controller to, based on the forwarded third information, search for a sound code assigned to the called terminal;
    receiving a sound code found by and returned from the storage controller; and
    providing the caller, via the second trunk connection and the call-originating exchanger, with the selected RBT-replacing sound associated with the found sound code as an RBT.

14. The method of claim 13, wherein
    the found sound code is transmitted from the storage controller to the sound database via the Internet protocol; and
    the selected RBT-replacing sound associated with the found sound code is transmitted to the call-originating exchanger via the second trunk connection.

15. The method of claim 13, wherein
    the third information received from the call-originating exchanger and forwarded to the storage controller by the sound database also identifies the caller; and
    the storage controller, based on identifications of both the caller and the called terminal included in the forwarded third information, searches for the sound code.

16. The method of claim 13, wherein the storage controller is a server which
    is separated from the call-originating exchanger, the call-terminating exchanger, the HLR and the sound database, and
    has an RBT service table where subscriber numbers are associated with sound codes, respectively.

17. The method of claim 1, wherein the response returned from the HLR to the call-originating exchanger includes not only said first and second information but also routing information furnished by the call-terminating exchanger.

18. The method of claim 1, further comprising:
    the HLR maintaining, for each subscriber, a profile that includes information on whether or not an RBT is to be replaced for the subscriber when called.

* * * * *